US009038267B2

(12) United States Patent
Schmid et al.

(10) Patent No.: US 9,038,267 B2
(45) Date of Patent: May 26, 2015

(54) METHOD OF SEPARATING HEAT EXCHANGER TUBES AND AN APPARATUS FOR SAME

(75) Inventors: Manfred Schmid, Leinfelden-Echterdingen (DE); Manfred Lenkner, Stuttgart (DE)

(73) Assignee: Modine Manufacturing Company, Racine, WI (US)

( * ) Notice: Subject to any disclaimer, the term of this patent is extended or adjusted under 35 U.S.C. 154(b) by 872 days.

(21) Appl. No.: 13/158,090

(22) Filed: Jun. 10, 2011

(65) Prior Publication Data

US 2011/0302782 A1    Dec. 15, 2011

(30) Foreign Application Priority Data

Jun. 10, 2010   (DE) .......................... 10 2010 023 384

(51) Int. Cl.
| | |
|---|---|
| B23P 15/26 | (2006.01) |
| B23D 31/00 | (2006.01) |
| B21C 37/22 | (2006.01) |

(52) U.S. Cl.
CPC ............ *B23D 31/002* (2013.01); *B21C 37/225* (2013.01)

(58) Field of Classification Search
CPC .......................... F28D 1/0391; B21C 37/151
USPC ......... 29/890.038, 890.032, 890.05, 890.053, 29/890.049, 890.033; 72/20, 3, 6.2, 385; 72/379.6; 165/149, 153, 179; 225/96.5, 225/103; 219/890.033
See application file for complete search history.

(56) References Cited

U.S. PATENT DOCUMENTS

| | | | |
|---|---|---|---|
| 1,242,652 | A | 9/1917 | Capell |
| 1,599,395 | A | 9/1926 | Hards |
| 2,222,842 | A | 11/1940 | Humphrey |
| 2,252,210 | A | 8/1941 | Seemiller |
| 2,373,218 | A | 4/1945 | Arnold |
| 2,444,463 | A | 7/1948 | Nordquist |
| 2,757,628 | A | 8/1956 | Johnston |
| 2,912,749 | A | 11/1959 | Bauernfeind et al. |
| 3,021,804 | A | 2/1962 | Simpelaar |
| 3,053,511 | A | 9/1962 | Godfrey |
| 3,229,760 | A | 1/1966 | Hurter et al. |
| 3,687,193 | A | 8/1972 | Wright |

(Continued)

FOREIGN PATENT DOCUMENTS

| | | |
|---|---|---|
| DE | 273441 | 7/1912 |
| DE | 401893 | 9/1924 |

(Continued)

OTHER PUBLICATIONS

DE 102010023384.6 German Search Report dated Jun. 10, 2010 (w/ English Translation—8 pages).

*Primary Examiner* — Richard Chang
(74) *Attorney, Agent, or Firm* — Michael Best & Friedrich LLP

(57) ABSTRACT

A method and apparatus of producing tubes for use in a heat exchanger, in which a tube is moved along a production line in a direction, predetermined breaking points are created in the tube, and in which the tube is severed at the predetermined breaking points to form individual tubes with a tearing-off device having a first clamp and a second clamp. The first clamp can be reciprocated along the direction, and the tube can be moved substantially continuously along the production line in the direction through the tearing-off device. Also, the second clamp can be reciprocated along the direction substantially simultaneously with the first clamp.

19 Claims, 4 Drawing Sheets

(56) References Cited

U.S. PATENT DOCUMENTS

| | | | |
|---|---|---|---|
| 3,734,135 A | 5/1973 | Mosier | |
| 3,793,999 A * | 2/1974 | Seiler et al. | 123/90.67 |
| 4,197,625 A | 4/1980 | Jahoda | |
| 4,215,744 A | 8/1980 | Bowles | |
| 4,470,452 A | 9/1984 | Rhodes | |
| 4,494,306 A * | 1/1985 | Immonen | 29/809 |
| 4,501,321 A | 2/1985 | Real et al. | |
| 4,506,135 A * | 3/1985 | Ziemek et al. | 219/107 |
| 4,570,700 A | 2/1986 | Ohara et al. | |
| 4,805,693 A * | 2/1989 | Flessate | 165/153 |
| 4,901,908 A | 2/1990 | Negura et al. | |
| 4,949,543 A | 8/1990 | Cottone et al. | |
| 5,036,909 A | 8/1991 | Whitehead et al. | |
| 5,058,266 A | 10/1991 | Knoll | |
| 5,097,579 A * | 3/1992 | Pringault | 29/214 |
| 5,179,770 A | 1/1993 | Block et al. | |
| 5,185,925 A | 2/1993 | Ryan et al. | |
| 5,186,250 A | 2/1993 | Ouchi et al. | |
| 5,201,117 A * | 4/1993 | Wright | 29/890.05 |
| 5,351,750 A | 10/1994 | Garcia | |
| 5,386,629 A | 2/1995 | Ouchi et al. | |
| 5,441,106 A | 8/1995 | Yukitake | |
| 5,456,006 A | 10/1995 | Study | |
| 5,457,885 A | 10/1995 | Ohashi et al. | |
| 5,692,300 A | 12/1997 | Conn et al. | |
| 5,761,785 A * | 6/1998 | Connolly | 29/249 |
| 5,799,727 A | 9/1998 | Liu | |
| 6,119,341 A | 9/2000 | Kato et al. | |
| 6,192,977 B1 | 2/2001 | Dey et al. | |
| 6,209,202 B1 | 4/2001 | Rhodes et al. | |
| 6,261,706 B1 | 7/2001 | Fukuda et al. | |
| 6,308,775 B1 | 10/2001 | Naumann | |
| 6,425,261 B2 | 7/2002 | Burk et al. | |
| 6,467,170 B2 | 10/2002 | Kato et al. | |
| 6,470,570 B2 * | 10/2002 | Prater et al. | 29/890.053 |
| 6,475,301 B1 | 11/2002 | Grab et al. | |
| 6,502,305 B2 | 1/2003 | Martins et al. | |
| 6,513,586 B1 | 2/2003 | Haussmann | |
| 6,527,045 B1 | 3/2003 | Osakabe et al. | |
| 6,537,388 B1 | 3/2003 | Wynns et al. | |
| 6,546,774 B2 | 4/2003 | Granetzke | |
| 6,640,886 B2 | 11/2003 | Lamich | |
| 6,640,887 B2 | 11/2003 | Abell et al. | |
| 6,666,265 B1 | 12/2003 | Kato et al. | |
| 6,684,492 B2 * | 2/2004 | Tachibana et al. | 29/799 |
| 6,988,539 B2 | 1/2006 | Kato et al. | |
| 7,107,680 B2 | 9/2006 | Ueda | |
| 7,117,936 B2 | 10/2006 | Ohata et al. | |
| 7,135,239 B2 | 11/2006 | Rajagopalan | |
| 7,152,671 B2 | 12/2006 | Shibagaki et al. | |
| 7,204,302 B2 | 4/2007 | Shibagaki et al. | |
| 7,487,589 B2 | 2/2009 | Smith et al. | |
| 7,665,512 B2 | 2/2010 | Brost et al. | |
| 8,191,258 B2 * | 6/2012 | Zobel et al. | 29/890.053 |
| 8,434,227 B2 * | 5/2013 | Eisele | 29/890.049 |
| 8,561,451 B2 * | 10/2013 | Opferkuch et al. | 72/379.6 |
| 2003/0024694 A1 | 2/2003 | Lamich | |
| 2004/0035910 A1 | 2/2004 | Dockus et al. | |
| 2004/0108305 A1 | 6/2004 | Harnisch et al. | |
| 2004/0194943 A1 | 10/2004 | Yamauchi | |
| 2004/0206482 A1 | 10/2004 | Bang | |
| 2005/0006082 A1 | 1/2005 | Brost et al. | |
| 2005/0077033 A1 | 4/2005 | Schmalzried | |
| 2005/0092476 A1 | 5/2005 | Hu et al. | |
| 2005/0133210 A1 | 6/2005 | Inagaki et al. | |
| 2005/0247444 A1 | 11/2005 | Ohata et al. | |
| 2006/0086491 A1 | 4/2006 | Ueda | |
| 2006/0230617 A1 | 10/2006 | Kent et al. | |
| 2006/0243429 A1 | 11/2006 | Chu et al. | |
| 2006/0265874 A1 | 11/2006 | Hashimoto et al. | |
| 2006/0283585 A1 | 12/2006 | Smith et al. | |
| 2007/0095514 A1 | 5/2007 | Inoue et al. | |
| 2009/0014164 A1 | 1/2009 | Zobel et al. | |
| 2009/0014165 A1 | 1/2009 | Zobel et al. | |
| 2009/0019689 A1 | 1/2009 | Zobel et al. | |
| 2009/0019694 A1 | 1/2009 | Zobel et al. | |
| 2009/0019695 A1 | 1/2009 | Zobel et al. | |
| 2009/0019696 A1 | 1/2009 | Zobel et al. | |
| 2009/0020277 A1 | 1/2009 | Zobel et al. | |
| 2009/0020278 A1 | 1/2009 | Zobel et al. | |
| 2009/0056927 A1 | 3/2009 | Zobel et al. | |
| 2009/0218085 A1 | 9/2009 | Rogers et al. | |
| 2009/0260794 A1 | 10/2009 | Minami et al. | |
| 2010/0243225 A1 | 9/2010 | Zobel et al. | |

FOREIGN PATENT DOCUMENTS

| | | |
|---|---|---|
| DE | 934644 | 11/1955 |
| DE | 935487 | 11/1955 |
| DE | 2113581 | 12/1972 |
| DE | 3809944 | 10/1989 |
| DE | 4031577 | 4/1992 |
| DE | 4340378 | 6/1994 |
| DE | 29614186 | 12/1997 |
| DE | 19641144 | 4/1998 |
| DE | 69316485 | 5/1998 |
| DE | 19753724 | 6/1999 |
| DE | 10137334 | 2/2003 |
| DE | 10200586 | 7/2003 |
| DE | 102004057407 | 8/2005 |
| EP | 0179646 | 4/1986 |
| EP | 0765701 | 4/1997 |
| EP | 0859209 | 8/1998 |
| EP | 0907062 | 4/1999 |
| EP | 1074807 | 2/2001 |
| EP | 1306156 | 5/2003 |
| EP | 1362649 | 11/2003 |
| EP | 1640684 | 3/2006 |
| EP | 1684041 | 7/2006 |
| EP | 1702710 | 9/2006 |
| FR | 2690233 | 10/1993 |
| FR | 2811746 | 1/2002 |
| GB | 444964 | 3/1936 |
| GB | 683161 | 11/1952 |
| GB | 2203677 | 10/1988 |
| GB | 2354960 | 4/2001 |
| GB | 2426727 | 12/2006 |
| JP | 57105690 | 7/1982 |
| JP | 58000094 | 1/1983 |
| JP | 60247426 | 12/1985 |
| JP | 7019779 | 1/1995 |
| JP | 09011021 | 1/1997 |
| JP | 10160375 | 6/1998 |
| JP | 2001050677 | 2/2001 |
| JP | 2002350083 | 12/2002 |
| JP | 2004092940 | 3/2004 |
| JP | 2005214511 | 8/2005 |
| JP | 2006064345 | 3/2006 |
| RU | 2032878 | 4/1995 |
| SU | 340209 | 1/1972 |
| SU | 616521 | 7/1978 |
| WO | 03/060412 | 7/2003 |
| WO | 2004/080640 | 9/2004 |
| WO | 2004/085948 | 10/2004 |
| WO | 2005/033606 | 4/2005 |
| WO | 2006/116857 | 11/2006 |
| WO | 2007/009588 | 1/2007 |
| WO | 2008/011115 | 1/2008 |

* cited by examiner

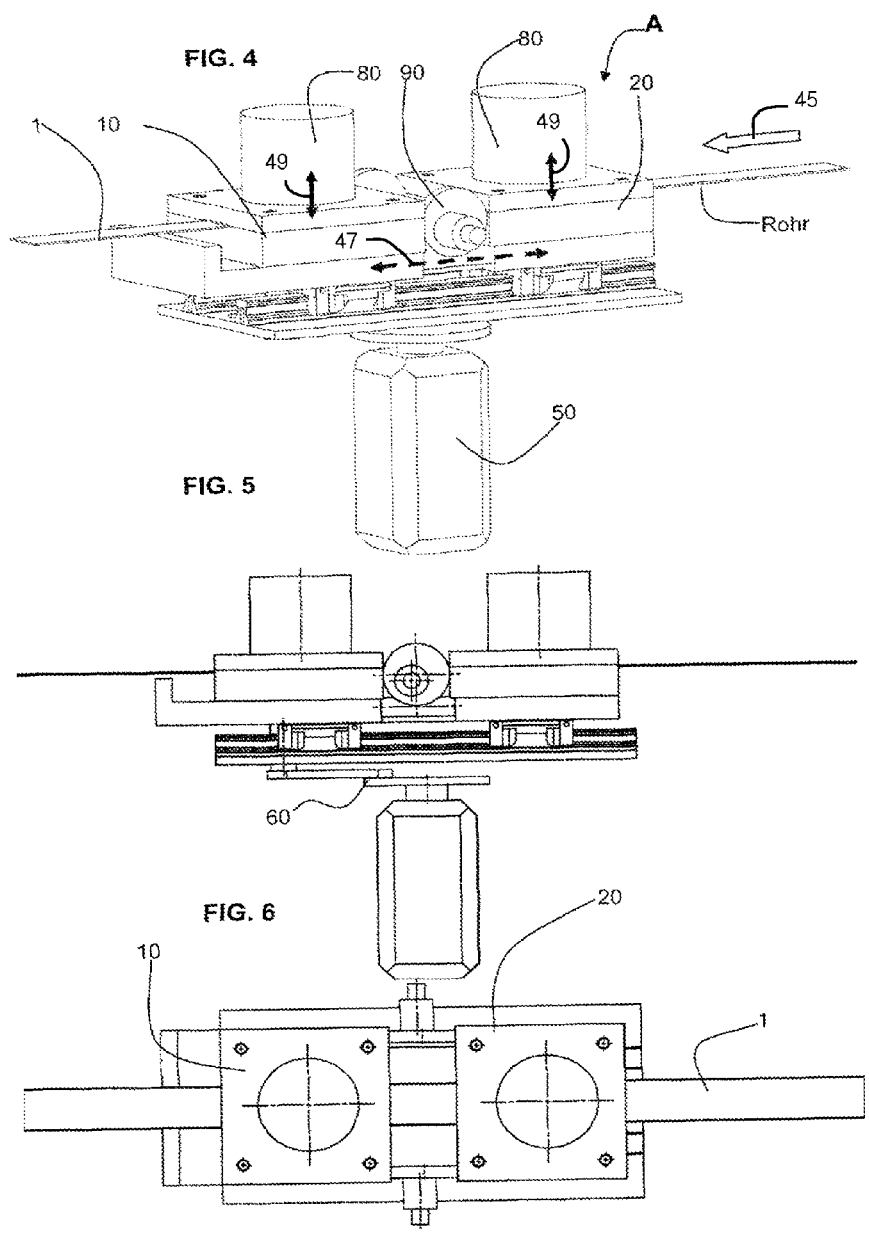

METHOD OF SEPARATING HEAT EXCHANGER TUBES AND AN APPARATUS FOR SAME

CROSS-REFERENCE TO RELATED APPLICATIONS

This application claims priority to German Patent Application No. 10 2010 023 384.6 filed Jun. 10, 2010, the entire contents of which are hereby incorporated by reference herein.

BACKGROUND

The invention relates to a production method for tubes, for example for use in heat exchangers, on a production line.

A production method is known from DE 10 2006 033 568 A1. In this application, individual tubes are broken off or cut off at predetermined breaking points. The alternative possibility for tearing off individual tubes is merely mentioned therein, but not shown and/or described. The tubes are produced from at least one endless strip, preferably from three endless strips.

A production method is known from DE 10 2006 033 568 A1. In this application, individual tubes are broken off or cut off at predetermined breaking points. The alternative possibility for tearing off individual tubes has merely been mentioned therein, but not shown and/or described. The tubes are produced from at least one endless strip, preferably from three endless strips.

With regard to the tearing off of the tubes, reference can be made, for example, to U.S. Pat. No. 5,653,022 which provides a pair of pull rollers and a pair of guide rollers, between which individual tubes are torn off. In the case of pairs of rolls of this type, undesirable slippage may occur during the tearing off. In this document, the tubes are extruded, i.e. they have not been produced from at least one metallic strip.

In EP 714 342B1, extruded tubes are likewise torn off between a stationary clamping device and a clamping device which is movable rectilinearly in the direction of the tube.

SUMMARY

A disadvantage of EP 714,342B1 can be that the tube advance has to be stopped at intervals corresponding to the required tube length in order, by means of a transversely movable slide, to incorporate a notch into the tube wall as a predetermined breaking point at which the tube can subsequently be torn off by means of the movable clamping device.

It is an object of this invention to design the above-defined production method to be more efficient.

This object can be achieved according to the invention by a production method and by a tearing-off device described herein.

According to an aspect of the production method according to the invention, a second clamp or clamping device is moved to and fro (i.e., reciprocated) in a direction of the tube substantially simultaneously with a first clamp (referred to herein also as a "clamping device"). In this case, "simultaneously" means that both clamping devices execute the to movements and the fro movements approximately simultaneously. Since the clamping devices are therefore not stationary, apart from reversing the direction of movement, the tube advance movement does not have to be interrupted. Therefore, according to a further feature according to the invention, the tube can be transported substantially continuously through the tearing-off device. The speed of the movement of the clamping devices corresponds at least to the speed of the tube. At least at the tearing-off moment, the speed of the one clamping device is greater than the tube speed. The tube runs at a fairly high speed continuously through the production line and therefore through the tearing-off device. According to the proposed method, for example, given a tube length of approximately 1.0 m, significantly more than 100 individual tubes per minute can be produced from the endless tube. In a trial operation, even approximately 300 individual tubes of a length of approximately 300 mm were produced per minute. It is possible, on the basis therefrom, to calculate the very high speed at which the clamping devices can be moved.

One clamping device completes a greater distance in the same unit or amount of time than the other clamping device. The one clamping device—as mentioned—is moved at a greater speed, at least during the tearing-off moment, as being used to transmit the tearing-off speed.

According to one feature, both the identically clocked movement of the clamping devices and the completing of the greater distance are carried out by means of an eccentric and by means of respective struts or respective connecting rods from the eccentric to the clamping devices. The struts differ in length. As a result, a simple and nevertheless highly effective construction of the tearing-off device can be realized. The pivot points of both connecting rods can be located either at one and the same position in the eccentric, or a distance between the pivot point can be provided. The provision of the distance makes it possible, for example, to increase the greater distance even further, or to increase the speed of the rectilinear movement of the one clamping device even further.

As an alternative, however, it is also possible for the identically clocked movement of the clamping devices to take place by means of an eccentric and for the greater distance of the one clamping device to be realized by means of a second eccentric.

During the to movements, the two clamping devices are closed and accordingly clamp the tube. During the fro movements, i.e. during the movement counter to the tube conveying direction, both clamping devices by contrast are open. In a preferred manner, the opening and closing of the clamping devices are controlled by means of cams which are located at the ends of the connecting rods and which act counter to a compressive force produced, for example, by means of springs.

Of course, the tearing-off device may also be used for tubes, for example, extruded or produced in another manner or for other individual parts to be brought to size.

The invention will now be described in three exemplary embodiments with reference to the attached drawings. The description below contains information, features and advantages of the present invention.

BRIEF DESCRIPTION OF THE DRAWINGS

FIGS. 4-6 show another apparatus according to some embodiments of the invention.

DETAILED DESCRIPTION

Figure 1:
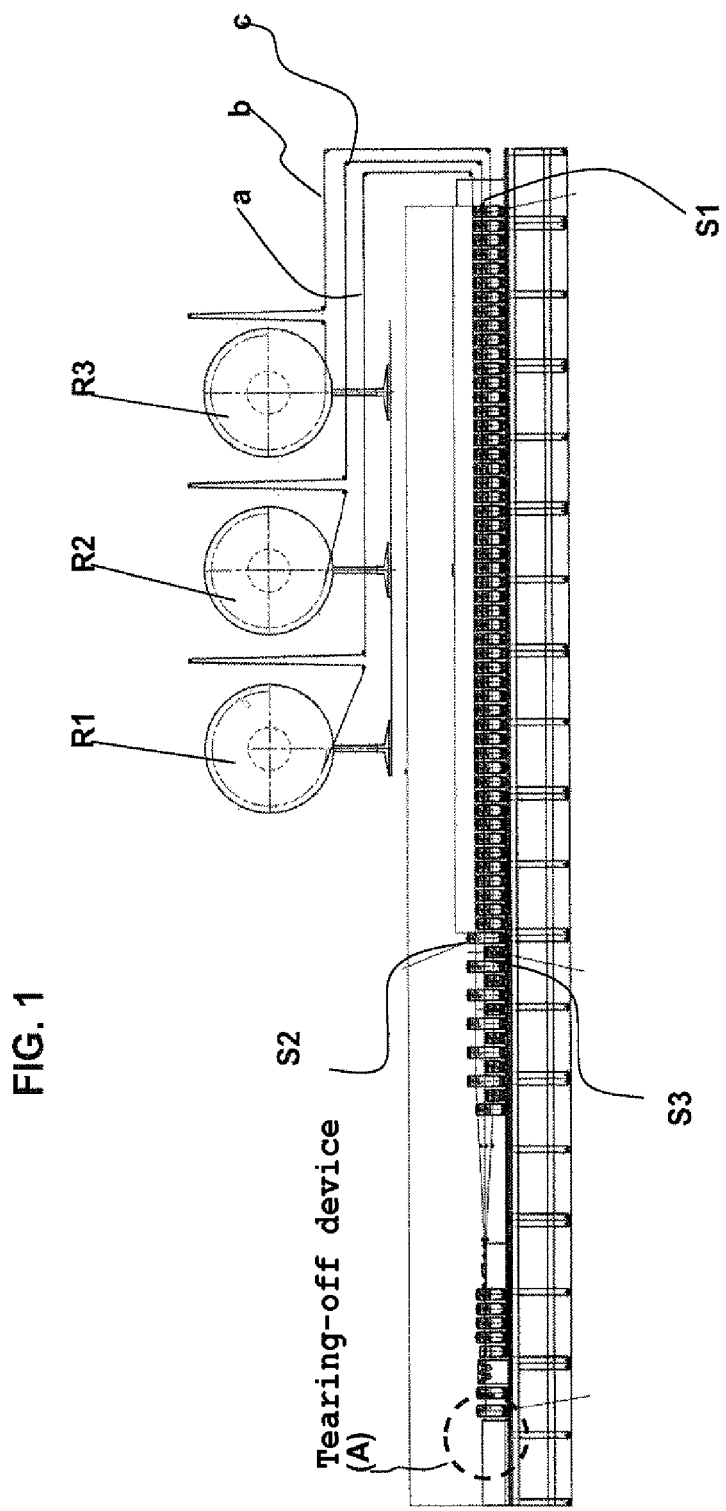
FIG. 1 is a schematic view of a production line with a tearing-off device at the end.
Figure 2:
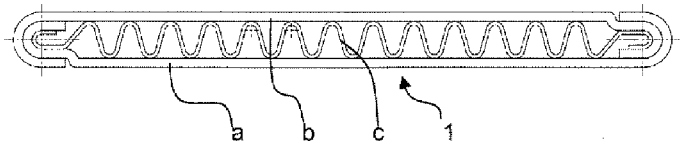
FIG. 2 is an end view of a flat tube produced on the production line according to FIG. 1.

Since the exemplary embodiments shown refer to the production of three-part tubes (FIG. 2, two wall parts a, b and an inner insert c), it can be gathered from FIG. 1 that three strip rolls R1, R2, R3 are present as the starting material. These involve extremely thin sheet aluminum. The strip roll R1 provides part a, the strip roll R2 provides part c and, finally, the strip roll R3 provides part b of the flat tube 1. As shown in the illustration, in each case one very large loop is present in the strip directly behind the strip rolls R1, R2, R3, by means of which different speeds or else stoppage of the strips can be compensated for. Depending on requirements, a plurality of loops may also be provided. The first predetermined breaking point station S1 is situated directly at the start of the production line, and said station introduces the predetermined breaking points (not shown) into the strip roll R2 (part c). Part c is subsequently shaped by means of pairs of rolls (not shown in detail) over a corresponding distance so as to provide the wavy configuration which can be seen in FIG. 2. The first predetermined breaking point station S1 is thus adjoined by a production line section in which one strip material is shaped so as to form part of the subsequent tube. The strip rolls R1 (part a) and R3 (part b) merely run through station S1 without being significantly shaped. The upper strip roll R1 then reaches the second predetermined breaking point station S2. This is followed at a short distance by the third predetermined breaking point station S3, through which the lower strip roll R3 runs in order to be correspondingly provided with predetermined breaking points. The edge deformations in parts a and b are then formed, and part c is mounted in between parts a and b (not shown in detail). However, reference can be made in this regard to patent application DE 10-2006-029 378 A1. Approximately in said section, the predetermined breaking points (not shown) are brought into alignment in the three parts a, b, c, by known open-loop and closed-loop control means (not shown) being used for this purpose. As is well known to a person skilled in the art, said section should be situated upstream from the region in which parts a, b, c have already been connected to one another and are in rigid physical contact. When parts a, b, c are subsequently joined to form the tube 1, an endless tube 1 is initially provided, as shown in the cross section according to FIG. 2, from which the individual tubes 1 can then be severed. In one embodiment (not shown), the three predetermined breaking point stations S1, S2, S3 are located at a common point of the production line, shortly upstream of the combining of the three strip rolls to form the tube 1. By means of the embodiment (not shown), the alignment of the predetermined breaking points in the strip rolls or at the later tube ends can be achieved more easily.

For the following representation of the invention, the design of the tube is of less importance. The tube may therefore be a tube 1 produced from one, from two or from three sheet metal strips or else tubes extruded or produced in another way but which, in contrast to the prior art described above, already are provided with predetermined breaking points upstream of the tearing-off device A. Furthermore, the method and device according to some embodiments can also serve to produce elongate individual parts of identical length, said parts not absolutely having to be tubes or parts thereof. In this respect, the tube 1 should be understood as being equivalent to any individual part.

Figure 3:
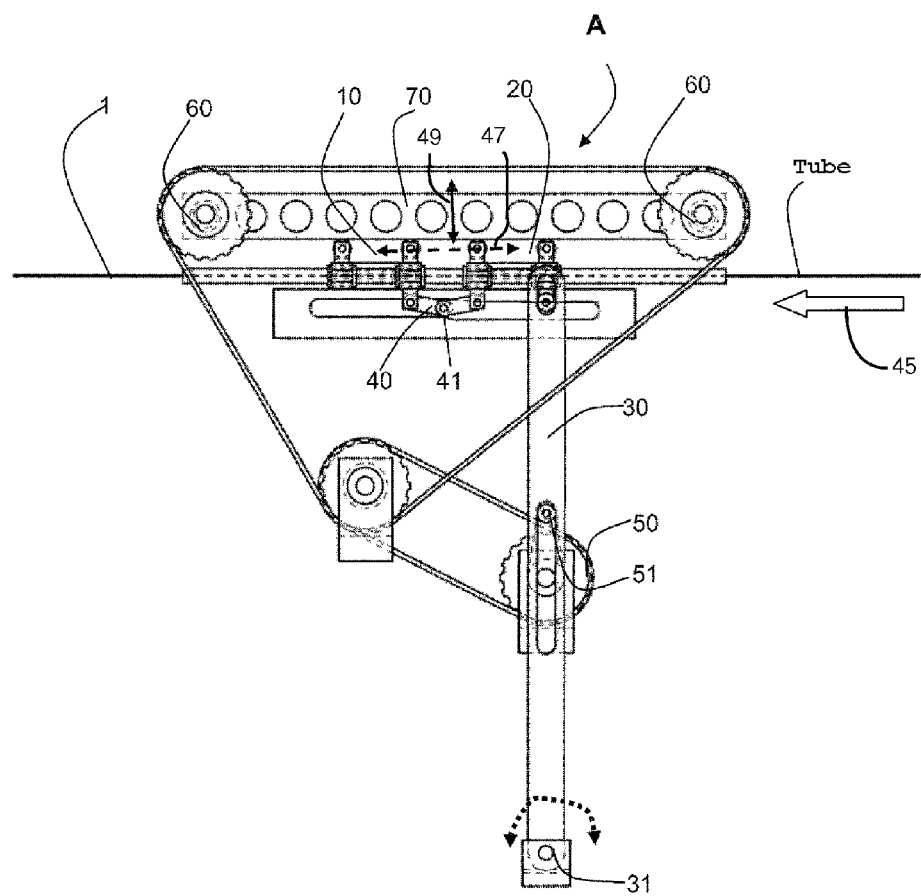
FIG. 3 shows an apparatus according to some embodiments of the invention.

FIG. 3 shows a first possible exemplary embodiment in which use is made of numerous mechanical means. In this exemplary embodiment, as in all of the other exemplary embodiments, the tube 1 is transported substantially continuously through the tearing-off device A. The block arrow 45 indicates the transport direction. A second clamp or clamping device 20 is moved to and fro (i.e., reciprocated) in the direction of the tube 1 substantially simultaneously with a first clamp or clamping device 10, which is intended to be indicated by the horizontal arrow 47 shown by dashed lines. The to and the fro or reciprocating movements of the clamping devices 10, 20 are created by means of a driven pivoting arm 30. The pivoting arm 30 is mounted pivotably at a lower end 31 and is connected at an upper end to the second clamping device 20. An electric driving motor 50 pivots the pivoting arm 31 to and fro via an eccentric 51 and, as a result, moves the clamping devices 10, 20 to and fro on a guide track. The illustrated clamping devices are connected to each other by means of a toggle lever 40. The axis of the toggle lever 40 rests on a slope 41 during the to movements, thus enabling the toggle lever 40 to be opened further and a force to be transmitted to the clamping devices 10, 20. The force increases the distance between the two clamping devices 10 and 20. The force tears off an individual tube 1 from the endless tube at a predetermined breaking point. At this moment, the predetermined breaking point (not shown) is located between the two clamping devices 10 and 20. The driving motor 50 also serves to carry out the opening and closing movements of the clamping devices 10 and 20. This is illustrated by means of torque transmission mechanisms which drive two eccentrics 60 or the like located at the top of the clamping devices 10 and 20. A tension rod 70 between the two eccentrics 60 located at the top moves substantially vertically up and down in a manner corresponding to the arrow 49 shown.

The movement downward constitutes the closing movement and the movement upwards correspondingly constitutes the opening movement. During the movement of the clamping devices 10, 20 to the left (to movement), the clamping devices are closed and, during the movement to the right, i.e. in the direction of the arriving endless tube (fro movement), the clamping devices are correspondingly opened. This to and fro movement generally applies to all of the exemplary embodiments shown.

FIG. 4 is a perspective view, FIG. 5 is a side view and FIG. 6 is a top view of a second exemplary embodiment. The embodiment of FIGS. 4-6 differs from the embodiment of FIG. 3 by the tearing off of the tube, i.e., the brief increase in the distance between the clamping devices 10, 20, not being undertaken by means of the toggle lever 40 but rather by means of an eccentric 90, the drive of which is not illustrated. The mechanical means have thereby been modified in comparison to the first exemplary embodiment. The opening and closing movements of the clamping devices 10, 20 take place here by means of electromechanical actuators 80. The to and fro movements of the clamping devices 10, 20 on a guide track are caused by another eccentric 60 which is rotated by a driving motor 50.

Figure 7:
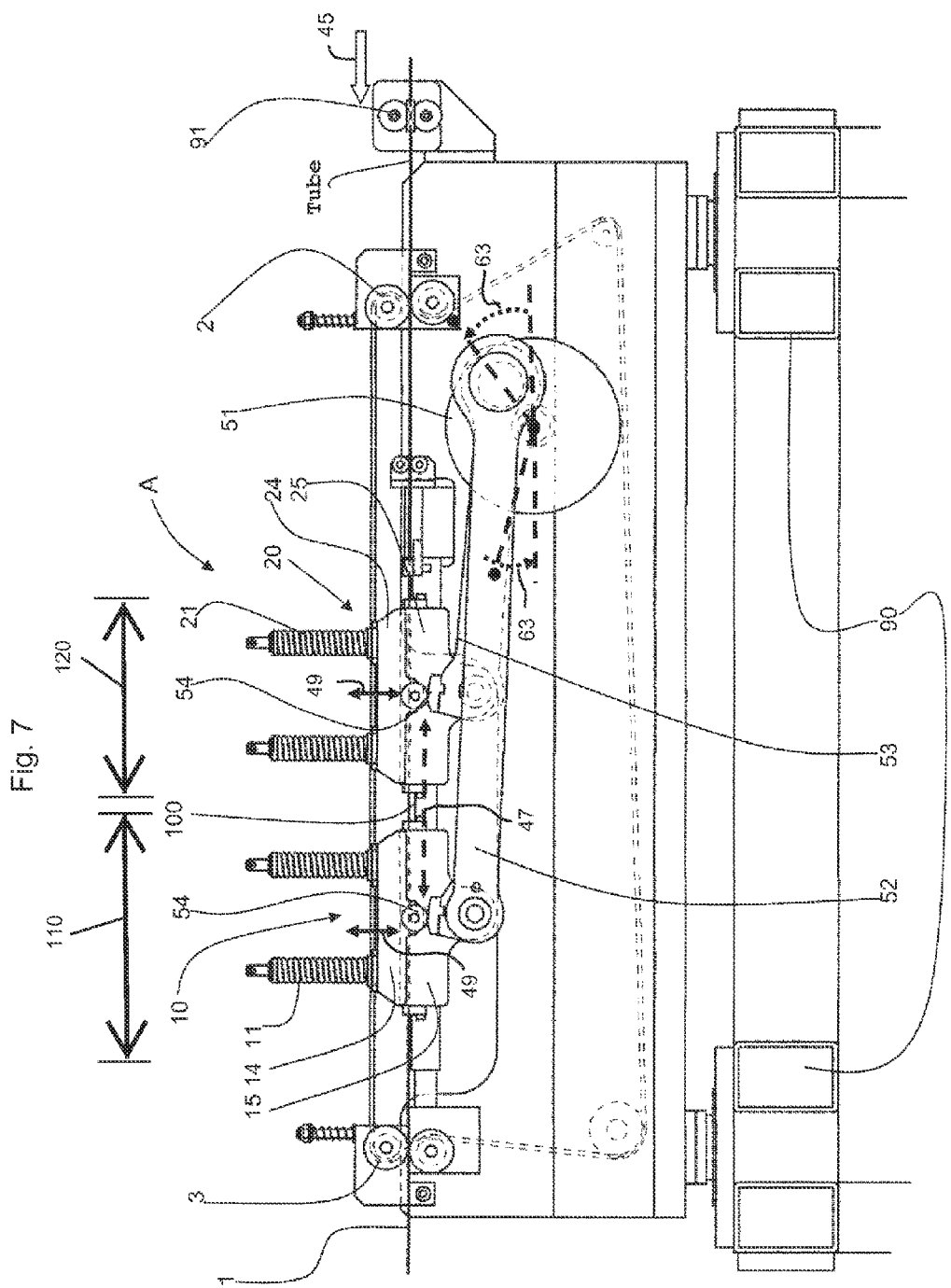
FIG. 7 shows another apparatus according to some embodiments of the invention.

Another exemplary embodiment has been illustrated in FIG. 7 as a side view of the device. A predetermined breaking point located between the clamping devices 10 and 20 at the moment of the tearing off of a tube 1 has been identified by the reference number 100 although the physical configuration of said predetermined breaking point cannot be seen clearly. A single driven eccentric 51 moves two connecting rods 52 and 53 of differing length. The connecting rod 52 is the longer rod since it is connected to the first clamping device 10 that is positioned further away. Accordingly, the shorter connecting rod 53 is connected to the closest clamping device 20. On the basis thereof, the first clamping device 10 covers a further distance 110, which is illustrated schematically in FIG. 7, during each rotation of the eccentric than the distance 120, which is also illustrated schematically in FIG. 7, covered by the second clamping device 20, and therefore moves at a greater speed. The resultant tearing force leads to a tube being torn off at the predetermined breaking point 100. The clamping devices 10 and 20 respectively have upper clamping jaws 14 and 24 and lower clamping jaws 15 and 25, between which the tube 1 is transported. A planar compressive force is generated between the clamping jaws 14, 15 and 24, 25, with a set of four compression springs 11 and 21 per clamping device 10, 20 being used for this purpose in this exemplary embodiment. In the side view, only two compression springs 11, 21 per clamping device can be seen. By means of the provision of a planar compressive force, disadvantageous slippage movements from the prior art can be avoided.

In order to open or to close the clamping devices 10, 20 in a clocked manner, movable cams 54 or the like are located at the ends of the connecting rods 52, 53. During the rotational movements, the cams briefly raise the upper clamping jaws 14 and 24 counter to the force of the compression springs 11 and 21, thus opening the clamping devices 10, 20. The clamping devices 10, 20 can be opened shortly before the beginning of the fro movement. Upon further rotation, namely during the following to movement of the clamping devices, the cams 54 move away from contact with the upper clamping jaws 14, 24, and the tube is secured between the clamping jaws by means of the planar compressive force. The eccentric 51 rotates at a correspondingly high speed which can correspond to the tube speed cited at the beginning Considerable acceleration forces are produced and have to be absorbed. Therefore, the tearing-off device A can have a stable base 90. At the beginning of the tearing-off device A, there is a sensor 91 which detects the positions of the individual predetermined breaking points 100 and permits appropriate process control, together with other control means (not shown). The tube 1 is additionally also transported in the tearing-off device A of this exemplary embodiment, for which purpose correspondingly driven pairs of rollers 2 can be provided, one at the beginning of the device and another 3 at the end thereof. The pair 3 of transport rollers located at the end can cause the individual tubes 1 to be ejected.

FIG. 7 can also be understood as being a snapshot during the operation of the tearing-off device A. The clamping devices 10, 20 are in the closed position discussed above. As can be seen by the position of the eccentric at this particular moment, the to movement of the clamping devices 10, 20 has just begun. The eccentric 51 rotates anticlockwise, as the dashed arrows 63 indicate. Approximately 20-30° of a complete angle of rotation of 360° have been completed. Shortly before the to movement has ended, i.e., when a rotational angle of the eccentric 51 of approximately 170° has been completed, the cams 54 open the clamping devices 10, 20. The opening can take place directly after an individual tube 1 has been ejected with the aid of the pair 3 of transport rollers. The opening position has been indicated merely by means of dashed lines, above and below the solid line (which illustrates the closed position) between the clamping jaws 14, 15 and 24, 25. The subsequent fro movement of the clamping devices 10, 20 is carried out in the open position (not illustrated specifically).

Various features and advantages of the invention are set forth in the following claims.

What is claimed is:

1. A method of producing individual tubes for use in a heat exchanger from at least one continuous strip of material, the method comprising:
    providing predetermined breaking points in the at least one continuous strip of material;
    forming at least a portion of a continuous tube from the continuous strip of material;
    moving the continuous tube along a production line in a direction; and
    severing the continuous tube at one of the predetermined breaking points to form one of the individual tubes with a tearing-off device having a first clamp and a second clamp, wherein severing the continuous tube includes;
    reciprocating the first clamp along the direction;
    moving the continuous tube substantially continuously along the production line in the direction through the tearing-off device;
    reciprocating the second clamp along the direction substantially simultaneously with the first clamp;
    moving a toggle lever that couples the first clamp to the second clamp along a slope;
    moving the first clamp with respect to the second clamp;
    moving the toggle lever along the slope; and
    severing the continuous tube by moving the first clamp with respect to the second clamp, including moving the first clamp a first distance in the direction and moving the second clamp a second distance in the direction that is less than the first distance.

2. The method of claim 1, wherein the first clamp travels the first distance and the second clamp travels the second distance in substantially the same amount of time.

3. The method of claim 1, further comprising,
    clamping the continuous tube by applying a first compressive force to the first clamp and a second compressive force to the second clamp; and
    releasing the continuous tube and at least one of individual tubes by opening the first and second clamps.

4. The method of claim 3, wherein the first compressive force is applied to the first clamp and the second compressive force is applied to the second clamp by at least one pneumatic actuator.

5. The method of claim 3, wherein the first compressive force is applied to the first clamp and the second compressive force is applied to the second clamp by at least one hydraulic actuator.

6. The method of claim 3, wherein the first compressive force is applied to the first clamp and the second compressive force is applied to the second clamp by at least one electrical actuator.

7. The method of claim 1, wherein forming at least a portion of the continuous tube from the continuous strip of material includes providing a first continuous metallic strip to the production line; and shaping the first continuous metallic strip to form the continuous tube.

8. The method of claim 1, wherein forming at least a portion of the continuous tube from the continuous strip of material includes
    providing a first continuous metallic strip to the production line;
    providing a second continuous metallic strip to the production line; and
    combining the first continuous metallic strip and the second continuous metallic strip to at least partially form the continuous tube.

9. The method of claim 1, wherein forming at least a portion of the continuous tube from the continuous strip of material includes
    providing a first continuous metallic strip to the production line;
    providing a second continuous metallic strip to the production line;
    providing a third continuous metallic strip to the production line; and
    combining the first continuous metallic strip, the second continuous metallic strip, and the third continuous metallic strip to form the continuous tube.

10. The method of claim 1, further comprising,
clamping the continuous tube by applying a first compressive force to both the first clamp and the second clamp; and
releasing the continuous tube and at least one of individual tubes by opening the first and second clamps.

11. The method of claim 1, further comprising,
severing one of the individual tubes from the continuous tube at the predetermined breaking point when the predetermined breaking point is located between the first clamp and the second clamp.

12. The method of claim 1, further comprising,
moving at least a portion of toggle lever eccentrically between the first clamp and the second clamp to increase the distance between the first clamp and the second clamp.

13. The method of claim 12, further comprising,
engaging the at least a portion of the toggle level upon the slope at a point between the first clamp and the second clamp.

14. The method of claim 1, further comprising,
rotating the toggle lever about an axis.

15. The method of claim 1, further comprising,
engaging a first toggle lever cam surface upon the slope to increase the distance between the first clamp and the second clamp.

16. The method of claim 1, further comprising,
engaging at least a portion of the toggle lever operationally with the second clamp to increase the distance between the first clamp and the second clamp.

17. The method of claim 1, further comprising,
engaging a second toggle lever cam surface operationally with the second clamp to increase the distance between the first clamp and the second clamp.

18. A method of producing individual tubes for use in a heat exchanger from at least one continuous strip of material, the method comprising:
providing predetermined breaking points in the at least one continuous strip of material;
forming at least a portion of a continuous tube from the continuous strip of material;
moving the continuous tube along a production line in a direction; and
severing the continuous tube at one of the predetermined breaking points to form one of the individual tubes with a tearing-off device having a first clamp and a second clamp, wherein severing the continuous tube includes;
reciprocating the first clamp along the direction;
moving the continuous tube substantially continuously along the production line in the direction through the tearing-off device;
reciprocating the second clamp along the direction substantially simultaneously with the first clamp;
rotating an eccentric;
reciprocating a first strut that couples the first clamp and the eccentric;
reciprocating a second strut that couples the second clamp and the eccentric to move the first clamp a first distance and to move the second clamp a second distance;
opening the first clamp using a first cam coupled to the first strut adjacent the first clamp;
closing the first clamp using the first cam to apply a compressive force to the endless continuous tube via the first clamp;
opening the second clamp using a second cam coupled to the second strut adjacent the second clamp; and
closing the second clamp using the second cam to apply a compressive force to the endless continuous tube via the second clamp.

19. A method of producing individual tubes for use in a heat exchanger from at least one continuous strip of material, the method comprising:
providing predetermined breaking points in the at least one continuous strip of material;
forming at least a portion of a continuous tube from the continuous strip of material;
moving the continuous tube along a production line in a direction; and
severing the continuous tube at one of the predetermined breaking points to form one of the individual tubes with a tearing-off device having a first clamp and a second clamp, wherein severing the continuous tube includes;
rotating an eccentric to substantially simultaneously reciprocate the first clamp and the second clamp along the direction by reciprocating a first strut that couples the first clamp and the eccentric and a second strut that couples the second clamp and the eccentric;
moving the continuous tube substantially continuously along the production line in the direction through the tearing-off device;
closing the first clamp to apply a compressive force to the continuous tube via the first clamp using a first cam coupled to the first strut adjacent the first clamp;
closing the second clamp to apply a compressive force to the continuous tube via the second clamp using a second cam coupled to the second strut adjacent to the second clamp;
moving the first strut such that the first clamp moves in the direction a first distance;
moving a second strut such that the second clamp moves in the direction a second distance;
opening the first clamp using the first cam; and
opening the second clamp using the second cam.

* * * * *